(12) United States Patent
Ulmann et al.

(10) Patent No.: US 12,087,936 B2
(45) Date of Patent: Sep. 10, 2024

(54) COMPOSITIONS AND USES THEREOF

(71) Applicant: Imerys Graphite & Carbon Switzerland SA, Bodio (CH)

(72) Inventors: Pirmin Ulmann, Giubiasco (CH);
Sergio Pacheco Benito, Biasca (CH);
Simone Zürcher, Origlio (CH);
Patrick Lanz, Bellinzona (CH);
Michael Spahr, Bellinzona (CH)

(73) Assignee: IMERYS GRAPHITE & CARBON SWITZERLAND, SA (CH)

( * ) Notice: Subject to any disclaimer, the term of this patent is extended or adjusted under 35 U.S.C. 154(b) by 105 days.

(21) Appl. No.: 17/302,634

(22) Filed: May 7, 2021

(65) Prior Publication Data

US 2021/0265620 A1 Aug. 26, 2021

Related U.S. Application Data

(62) Division of application No. 16/332,122, filed as application No. PCT/EP2017/072923 on Sep. 12, 2017, now Pat. No. 11,081,690.

(30) Foreign Application Priority Data

Sep. 12, 2016 (EP) ..................... 16188389

(51) Int. Cl.
*H01M 4/1393* (2010.01)
*H01M 4/04* (2006.01)
*H01M 4/133* (2010.01)
*H01M 4/134* (2010.01)
*H01M 4/1395* (2010.01)
*H01M 4/36* (2006.01)
*H01M 4/38* (2006.01)
*H01M 4/583* (2010.01)
*H01M 10/052* (2010.01)
*H01M 10/0525* (2010.01)
*H01M 4/02* (2006.01)

(52) U.S. Cl.
CPC .......... *H01M 4/1393* (2013.01); *H01M 4/04* (2013.01); *H01M 4/133* (2013.01); *H01M 4/134* (2013.01); *H01M 4/1395* (2013.01); *H01M 4/364* (2013.01); *H01M 4/386* (2013.01); *H01M 4/583* (2013.01); *H01M 10/052* (2013.01); *H01M 10/0525* (2013.01); *H01M 2004/021* (2013.01); *H01M 2004/027* (2013.01); *Y02T 10/70* (2013.01)

(58) Field of Classification Search
None
See application file for complete search history.

(56) References Cited

U.S. PATENT DOCUMENTS

| 10,270,100 | B2 | 4/2019 | Mihara et al. | |
| 2013/0273433 | A1* | 10/2013 | Jouanneau-Si Larbi | H01M 4/133 252/502 |
| 2013/0295454 | A1* | 11/2013 | Huang | H01M 4/625 252/511 |
| 2015/0270536 | A1* | 9/2015 | Kawakami | H01M 4/366 252/502 |
| 2016/0049665 | A1 | 2/2016 | Hironori et al. | |
| 2016/0211514 | A1 | 7/2016 | Youm | |
| 2016/0365567 | A1* | 12/2016 | Troegel | H01M 4/587 |
| 2017/0271651 | A1 | 9/2017 | Behan et al. | |
| 2018/0097229 | A1 | 4/2018 | Jo et al. | |
| 2018/0159125 | A1 | 6/2018 | Kamimura et al. | |

FOREIGN PATENT DOCUMENTS

| JP | 2004-055505 A | 2/2004 |
| JP | 2016-132608 A | 7/2016 |
| WO | WO 2011/006698 A1 | 1/2011 |
| WO | WO 2014/143213 | 9/2014 |
| WO | WO 2016/009938 A1 | 1/2016 |
| WO | WO 2016/085953 A1 | 6/2016 |

OTHER PUBLICATIONS

International Search Report and Written Opinion dated Mar. 8, 2018, in International Application No. PCT/EP2017/072923 (16 pgs.).

* cited by examiner

*Primary Examiner* — Carlos Barcena
(74) *Attorney, Agent, or Firm* — FINNEGAN, HENDERSON FARABOW, GARRETT & DUNNER LLP

(57) ABSTRACT

A silicon-carbon particulate composite suitable for use as active material in a negative electrode of a Li-ion battery, a precursor composition comprising the silicon-carbon particulate composite, a negative electrode comprising the silicon-carbon particulate composite and/or precursor composition, a Li-ion battery comprising the negative electrodes, a method of manufacturing the silicon-carbon particulate composite, precursor composition, negative electrode and Li-ion battery, the use of the silicon-carbon particulate composite in a negative electrode of a Li-ion battery to inhibit or prevent silicon pulverization during cycling, for example, during 1st cycle Li intercalation or de-intercalation and/or to maintain electrochemical capacity after 100 cycles, and a device, energy storage cell, or energy storage and conversion system comprising the silicon-carbon particulate composite and/or precursor composition.

16 Claims, 4 Drawing Sheets ated application of application Ser. No. 16/332,122, filed Mar. 11, 2019, which is a U.S. national phase entry under 35 U.S.C. § 371 from PCT International Application No. PCT/EP2017/072923, filed Sep. 12, 2017, which claims the benefit of priority of EP Application No. 16188389.7, filed Sep. 12, 2016, to which this application claims priority. The contents of all of these applications are incorporated herein by reference for all purposes in their entireties.

COMPOSITIONS AND USES THEREOF

CLAIM FOR PRIORITY

This application is a divisional application of application Ser. No. 16/332,122, filed Mar. 11, 2019, which is a U.S. national phase entry under 35 U.S.C. § 371 from PCT International Application No. PCT/EP2017/072923, filed Sep. 12, 2017, which claims the benefit of priority of EP Application No. 16188389.7, filed Sep. 12, 2016, to which this application claims priority. The contents of all of these applications are incorporated herein by reference for all purposes in their entireties.

TECHNICAL FIELD

The present invention is directed to a silicon-carbon particulate composite suitable for use as active material in a negative electrode of a Li-ion battery, to a precursor composition comprising the silicon-carbon particulate composite, to a negative electrode comprising the silicon-carbon particulate composite and/or precursor composition, to a Li-ion battery comprising the negative electrodes, to a method of manufacturing the silicon-carbon particulate composite, precursor composition, negative electrode and Li-ion battery, to the use of the silicon-carbon particulate composite in a negative electrode of a Li-ion battery to inhibit or prevent silicon pulverization during cycling, for example, during 1st cycle Li intercalation or de-intercalation and/or to maintain electrochemical capacity after 100 cycles, and to a device, energy storage cell, or energy storage and conversion system comprising the silicon-carbon particulate composite and/or precursor composition.

BACKGROUND

Metals forming compounds or alloys with lithium exhibit very high specific charge in the negative electrode in lithium ion batteries. For example, the theoretical specific charge of silicon metal electrodes can be up to 4'200 mAh/g. However, silicon particles can crack owing to the large volume expansion of silicon when inserting lithium electrochemically (i.e., during lithium intercalation and de-intercalation). This cracking problem is known as silicon pulverization. Further, the creation of new surfaces during particle cracking can lead to excessive electrolyte decomposition and de-contacting of the silicon from the electrode. Silicon pulverization manifests as specific charge losses after several charge/discharge cycles as well as irreversible capacity during first cycle charge and discharge and, in general, poor cycle stability. These are significant limitations that have delayed the adoption of silicon-based active materials in commercial lithium-ion batteries.

There is ongoing need to develop new silicon active materials for electrode materials which address the problem of silicon pulverization and the concomitant cycling stability problems.

SUMMARY OF THE INVENTION

A first aspect of the present invention is directed to a silicon-carbon particulate composite suitable for use as active material in a negative electrode of a Li-ion battery, having one or more of:
  (i) microporosity of at least 5.0%, optionally no greater than about 25.0%,
  (ii) a BJH average pore width of less than about 250 Å, and
  (iii) a BJH volume of pores of from about 0.05 cm$^3$/g to about 0.25 cm$^3$/g.

A second aspect of the present invention is directed to a precursor composition for a negative electrode of a Li-ion battery, the precursor composition comprising a silicon-carbon particulate composite according to first aspect, comprising a further carbonaceous particulate, optionally wherein the further carbonaceous particulate comprises at least two different types of carbonaceous particulate.

A third aspect of the present invention is directed to a negative electrode comprising a silicon-carbon particulate composite according to the first aspect.

A fourth aspect of the present invention is directed to a negative electrode comprising a precursor composition according to the second aspect.

A fifth aspect of the present invention is directed to a Li-ion battery comprising an electrode according to third or fourth aspect.

A sixth aspect of the present invention is directed to a Li-ion battery comprising a negative electrode which comprises a silicon-carbon particulate composite, wherein silicon pulverization does not occur during 1st cycle lithium intercalation and de-intercalation and/or wherein electrochemical capacity is maintained after 100 cycles.

A seventh aspect of the present invention is directed to a method of making a silicon-carbon particulate composite, comprising co-milling silicon and carbonaceous starting materials under wet conditions to produce a silicon-carbon particulate composite having a nanostructure which inhibits or prevents silicon pulverization when used as active material in a negative electrode of a Li-ion battery and/or which maintains electrochemical capacity of a negative electrode.

An eighth aspect of the present invention is directed to a method of preparing a precursor composition for a negative electrode of a Li-ion battery, comprising preparing, obtaining, providing or supplying a silicon-carbon particulate composite according to first aspect or obtainable by a method according to the seventh aspect, and combining with a further carbonaceous particulate.

A ninth aspect of the present invention is directed to a method of preparing a precursor composition for a negative electrode of a Li-ion battery, comprising, preparing, obtaining, providing or supplying a carbonaceous particulate and combining with a silicon-carbon particulate composite according to first aspect or obtainable by a method according to the seventh aspect.

A tenth aspect of the present invention is directed to a method of preparing a precursor composition for a negative electrode of a Li-ion battery, comprising combining a silicon-carbon particulate composite according to first aspect or obtainable by a method according to the seventh aspect with a further carbonaceous particulate.

An eleventh aspect of the present invention is directed to a method of manufacturing a negative electrode for a Li-ion battery, comprising forming the negative electrode from a precursor composition according to the second aspect or obtainable by a method according to any one of eighth, ninth or tenth aspects, optionally wherein the precursor composition comprises additional components or is combined with additional components during forming, optionally wherein the additional components include binder.

A twelfth aspect of the present invention is directed to the use of a silicon-carbon particulate composite as active material in a negative electrode of a Li-ion battery to inhibit or prevent silicon pulverization during cycling, for example, during 1st cycle Li intercalation or de-intercalation and/or to maintain electrochemical capacity after 100 cycles.

A thirteenth aspect of the present invention is directed to the use, as active material in a negative electrode of a Li-ion battery, of a silicon-carbon particulate composite according to the first aspect, for improving cycling stability of the Li-ion battery compared to a Li-ion battery which comprises an active material which is a mixture of silicon particulate and carbonaceous particulate which is not a composite and/or does not have a nanostructure which inhibits or prevents silicon pulverization during cycling, for example, during 1st cycle Li intercalation, and/or which is not prepared by co-milling and/or does not have a nanostructure which maintains electrochemical after 100 cycles.

A fourteenth aspect of the present invention is directed to the use of a carbonaceous particulate material in a negative electrode of a Li-ion battery, wherein the electrode comprises a silicon-carbon particulate composite according to the first aspect.

A fifteenth aspect of the present invention is directed to a device comprising the electrode according to the third and/or fourth aspect, or comprising a Li-ion battery according to the fifth and/or sixth aspect.

A sixteenth aspect of the present invention is directed to an energy storage cell comprising a silicon-carbon particulate composite according to the first aspect or a precursor composition according to the second aspect.

A seventeenth aspect of the present invention is directed to an energy storage and conversion system comprising a silicon-carbon particulate composite according to the first aspect or a precursor composition according to the second aspect.

DETAILED DESCRIPTION OF THE INVENTION

Figure 1A:
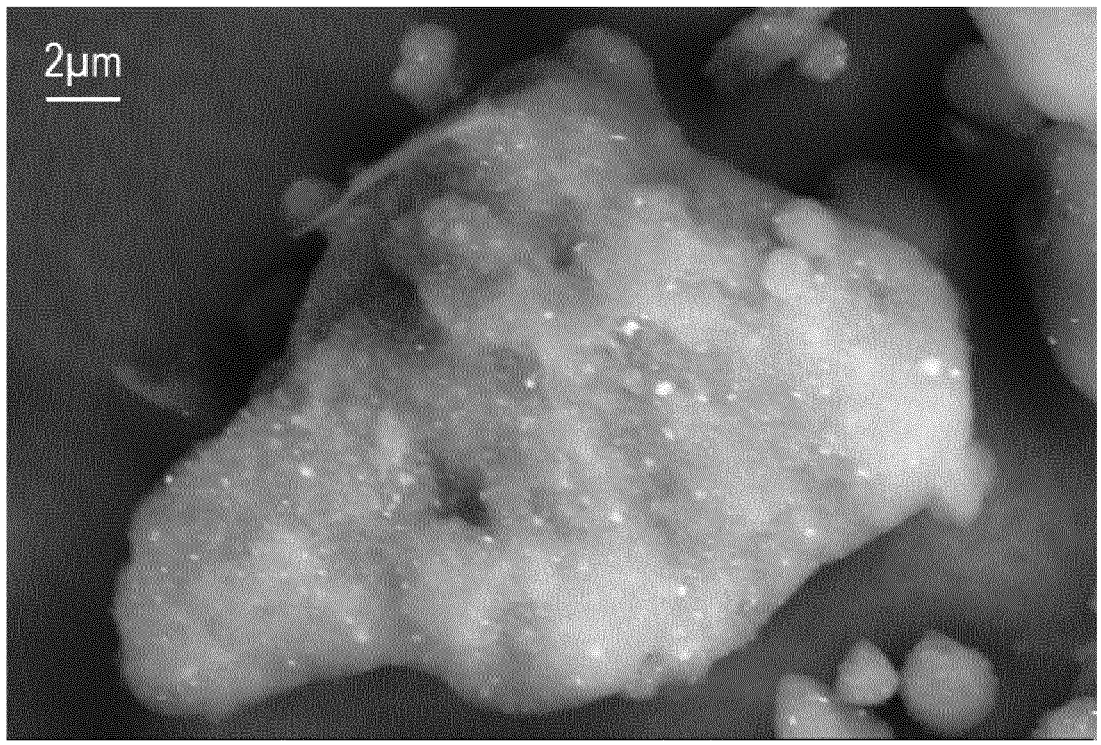
FIG. 1A is a SEM picture of Nano-composite 1 prepared according to the Examples.

It has surprisingly been found that by controlling the nanostructure and morphology of a silicon-carbon particulate, by co-milling silicon and carbonaceous starting materials under conditions which promote the formation of said nanostructure and morphology, produces a composite material that exhibits Si-nanodomains in close contact to conductive carbon in a three-dimensional network-like structures which are well suited to accommodate the large volume change that occurs with lithium-intercalation and de-intercalation in a negative electrodes of a Li-ion battery. More particularly, the silicon-carbon particulate inhibits or mitigates silicon pulverization during electrochemical lithium insertion/extraction and de-contacting effects which can occur with such large volume changes, by reducing the extent of the volume change and/or by providing sufficient pore void space to better accommodate said volume expansion during lithiation, thus improving cycling stability and/ or reducing capacity losses during cycling of the Li-ion battery. Contact between nano-Si domains also remains favorable because of the three-dimensional network-like structure of these composites, as opposed to one-dimensional nano-Si morphologies (e.g. Si-nanotubes or nanowires) that upon breakage at a single point result in de-contacted nano-Si structures.

The silicon-carbon particulate composite suitable for use as active material in a negative electrode of a Li-ion battery has one or more of:
  (i) microporosity of at least 5.0%, optionally no greater than about 25.0%,
  (ii) a BJH average pore width of less than about 250 Å, and
  (iii) a BJH volume of pores of from about 0.05 cm$^3$/g to about 0.25 cm$^3$/g.

By "silicon-carbon particulate composite" is meant a particulate composite in which individual particles have a morphology other than a one-dimensional morphology such as nanotubes or nanowires.

By "microporosity" is meant the % of external surface area of micropores in relation to the total BET specific surface area of the particulate. As used herein, a "micropore" means a pore width of less than 20 Å, a "mesopore" means a pore width of from 20 Å to 500 Å, and a "macropore" means a pore width of greater than 500 Å, in accordance with the IUPAC classification.

In certain embodiments, the silicon-carbon particulate composition has one or more of:
  (i) a microporosity of from about 5.0% to about 20%,
  (ii) a BJH average pore width of from about 50 Å to about 200 Å, and
  (iii) a BJH volume of pores of at least about 0.10 cm$^3$/g In certain embodiments (which may be referred to as Embodiment A), the silicon-carbon particulate has one or more of:
  (i) a microporosity of from about 5% to about 20%, for example, from about 8-17%
  (ii) a BJH average pore width of from about 75 Å to about 150 Å, for example, from about 100-150 Å, and,
  (iii) a BJH volume of pores of at least about 0.50 cm$^3$/g, for example, from about 0.50 cm$^3$/g to about 1.25 cm$^3$/g.

In such embodiments, the microporosity may be from about 10-20%, or from about 12-18%, or from about 13-17%, the BJH average pore width may be from about 100 Å to about 150 Å, or from about 120-150 Å, or from about 120-140 Å, and the BJH volume of pores may be at least about 0.75 cm$^3$/g, for example, from about 0.75-1.25 cm$^3$/g, or from about 0.90-1.10 cm$^3$/g.

In such embodiments, the microporosity may be from about 5-15%, or from about 7-13%, or from about 8-11%, the BJH average pore width may be from about 75 Å to about 135 Å, or from about 90-120 Å, or from about 100-120 Å, and the BJH volume of pores may be at least about 0.60 cm$^3$/g, for example, from about 0.70-1.10 cm$^3$/g, or from about 0.80-1.00 cm$^3$/g.

In certain embodiments (which may be referred to as Embodiment B), the silicon-carbon particulate has one or more of:
  (i) a microporosity of from about 5% to about 15%, for example, from about 10-15%

(ii) a BJH average pore width of from about 100 Å to about 180 Å, for example, from about 130 Å to about 150 Å, and (iii) a BJH volume of pores of at least about 0.10 cm³/g, for example, from about 0.10 cm³/g to about 0.25 cm³/g.

In such embodiments, the microporosity may be from about 8-17%, or from about 10-15%, or from about 11-14%, the BJH average pore width may be from about 120 Å to about 160 Å, or from about 125-150 Å, or from about 135-145 Å, and the BJH volume of pores may be at least about 0.12 cm³/g, for example, from about 0.12-0.18 cm³/g, or from about 0.90-1.10 cm³/g.

In certain embodiments, the silicon-carbon particulate at least two of (i), (ii) and (iii), for example, (i) and (ii), or (ii) and (iii), or (i) and (iii). In certain embodiments, the silicon-carbon-particulate has each of (i), (ii) and (iii).

In certain embodiments, the silicon-carbon particulate composite may be further characterized in having:

(1) a BET specific surface area (SSA) equal to or lower than about 400 m²/g; and/or (2) an average particle size of from about 50-2000 Å.

In certain embodiments, the silicon-carbon particulate composite has an average particle size of from about 50-1750 Å, or from about 50-1500 Å, or from about 50-1250 Å, or from about 50-1000 Å, or from about 50-750 Å.

The BET SSA, pore volume and average particle size may vary depending on the amount of silicon in the silicon-carbon particulate. For example, at high silicon levels, e.g., a weight ratio of Si:C of at least about 3:1, or at least about 4:1, or at least about 5:1, or at least about 6:1, or at least about 7:1, or at least about 8:1, the BET SSA and pore volume will be higher, and the average particle size will be lower, compared to a silicon-carbon particulate in which the weight ratio of Si:C is at least about 1:3, or at least about 1:4, or at least about 1:5, or at least about 1:6, or at least about 1:7, or at least about 1:8.

Thus, in certain embodiments, such as Embodiment A, the silicon-carbon particulate composite may be further characterized in having:

(1) a BET specific surface area (SSA) of from about 100 to about 400 m²/g, for example, from about 200-400 m²/g, or from about 250-350 m²/g, or from about 275-325 m²/g, or from about 275-300 m²/g, or from about 300-325 m²/g; and/or (2) an average particle size of from about 50 Å to about 300 Å, for example, from about 50-200 Å, or from about 50-150 Å, or from about 50-100 Å, or from about 75-100 Å, or from about 80-95 Å.

In such embodiments, the BET SSA may be from about 275-325 m²/g, the average particle size may be from about 50-200 Å, for example, from about 50-150 Å, or from about 50-100 Å, the BJH average pore width may be from about 100 Å to about 140 Å, the BJH volume of pores may be from about 0.75 cm³/g, to about 1.25 cm³/g, and the microporosity may be from about 5-20%, for example, from about 12-18% or from about 8-12%.

In certain embodiments, such as Embodiment B, the silicon-carbon particulate composite may be further characterized in having:

(1) a BET specific surface area (SSA) of from about 10 m²/g to about 100 m²/g, for example, from about 20-80 m²/g, or from about 20-60 m²/g, or from about 30-50 m²/g, or from about 35-45 m²/g, or from about 40-45 m²/g; and/or (2) an average particle size of from about 250 Å to about 1000 Å, for example, from about 450-850 Å, or from about 500-800 Å, or from about 550-700 Å, or from about 575-675 Å, or from about 600-650 Å, or from about 620-640 Å.

In such embodiments, the BET SSA may be from about 30-50 m²/g, the average particle size may be from about 300-1000 Å, for example, from about 500-700 Å, or about 600-650 Å, the BJH average pore width may be from about 130 Å to about 150 Å, the BJH volume of pores may be from about 0.12 cm³/g, to about 0.16 cm³/g, and the microporosity may be from about 8-15%, for example, from about 10-13%.

In certain embodiments, such as Embodiment A, a majority of the silicon-carbon particulate composite is silicon, based on the total weight of the composite, for example, at least about 60 wt. %, or at least about 70 wt. %, or at least about 80 wt. %, or at least about 90 wt. % of the composite is silicon.

In certain embodiments, such as Embodiment B, a majority of the silicon-carbon particulate composite is carbon, based on the total weight of the composite, for example, at least about 60 wt. %, or at least about 70 wt. %, or at least about 80 wt. %, or at least about 90 wt. % of the composite is carbon.

In certain embodiments, the silicon-carbon particulate composition has a nanostructure which inhibits or prevents silicon pulverization when used as active material in a negative electrode of a Li-ion battery.

By "inhibiting or preventing silicon pulverization" is meant that Li is de-intercalated in a single amorphous phase in a continuous process, more particularly, that the nanostructure promotes the formation of amorphous $Li_xSi$ with the gradual change of X in one continuous phase, and in the substantial absence of the formation of two phases containing crystalline Si and crystalline $Li_{15}S_4$. The formation of crystalline $Li_{15}S_4$ is detectable in a $1^{st}$ cycle Li intercalation and de-intercalation curve by the presence of a characteristic plateau in the de-intercalation curve part way between full charge and full discharge. The plateau is characterized in that the Potential vs. Li/Li+ [V] (which is the Y-axis of the $1^{st}$ cycle Li intercalation and de-intercalation curve) changes by no more than about 0.05 V across a Specific Charge/372 mAh/g (which is the X-axis of the $1^{st}$ cycle Li interaction and de-intercalation curve) of 0.2. An example of this characteristic plateau is shown in FIG. 4C. Without wishing to be bound by theory, it is believed that the silicon-carbon particulate composite reduces the extent of volume expansion during lithium intercalation, by preventing or at least inhibiting the formation of Si—Li crystalline alloy phases, and promotes the formation of an amorphous $Li_xSi$ phase, and moreover provides sufficient pore void space to better accommodate said volume expansion during lithiation, thus improving cycling stability and/or reducing capacity losses during cycling of the Li-ion battery. The result is improvement in cycle stability and reduction in specific charge loss.

Additionally or alternatively, therefore, in certain embodiments, the silicon particulate has a nanostructure which maintains electrochemical capacity of a negative electrode, of a Li-ion battery when used as active material. By "maintains electrochemical capacity", means that the specific charge of the negative electrode after 100 cycles is at least 85% of the specific charge after 10 cycles, for example, at least 90% of the specific charge after 10 cycles, or at least 95% of the specific charge after 10 cycles. In other words, the negative electrode comprising the silicon particulate may have at least 85% capacity retention after 100 cycles, for example, at least 90% capacity retention after 100 cycles, or at least 95% capacity retention after 100 cycles.

In certain embodiments, the silicon-carbon particulate composite is prepared by co-milling silicon and carbon starting materials under wet conditions, i.e., by wet-milling, in accordance with the methods described herein.

Method of Making Silicon Particulate

The silicon-carbon particulate composite may be manufactured by co-milling silicon particulate and carbonaceous particulate starting materials under wet conditions to produce a silicon-carbon particulate composite according to the first aspect and/or having a nanostructure which inhibits or prevents silicon pulverization and/or maintains electrochemical capacity when use as active material in a negative electrode of a Li-ion battery. By "wet conditions" or "wet-milling" is meant milling in the presence of a liquid, which may be organic, aqueous or a combination thereof.

In certain embodiments, the silicon particulate starting material comprises silicon microparticles having particle sizes of from about 1 μm to about 100 μm, for example, from about 1 μm to about 75 μm, or from about 1 μm to about 50 μm, or from about 1 μm to about 25 μm, or from about 1 μm to about 10 μm. In certain embodiments, the silicon particulate starting material is a micronized silicon particulate having a particle size of from about 1 μm to about 10 μm. Carbonaceous particulate starting materials are described below.

In certain embodiments, the method comprises one or more of the following:
(iv) wet-milling in the presence of a solvent, for example, an aqueous alcohol-containing mixture,
(v) wet-milling in a rotor-stator mill, a colloidal mill or a media mill,
(vi) wet-milling under conditions of high shear and/or high power density,
(vii) wet-milling in the presence of relatively hard and dense milling media, and
(viii) drying.

In certain embodiments, the method comprise two or more of (i), (ii), (iii) and (iv) followed by drying, for example, three or more of (i), (ii), (iii) and (iv) followed by drying, or all of (i), (ii), (iii) and (iv) followed by drying.

(i) Wet Milling in the Presence of an Aqueous Alcohol-Containing Mixture

In certain embodiments, the solvent is an aqueous alcohol-containing mixture may comprise water and alcohol in a weight ratio of from about 10:1 to about 1:1, for example, from about 8:1 to about 2:1, or from about 6:1 to about 3:1, or from about 5:1 to about 4:1. The total amount of liquid may be such to produce a slurry of the silicon particulate starting material having a solids content of no greater than about 30 wt. %, for example, no greater than about 25 wt. %, or no greater than about 20 wt. %, or no greater than about 15 wt. %, or at least about 5 wt. %, or at least about 10 wt. %.

The liquid plus silicon particulate starting material and carbonaceous particulate starting material may be in the form of a slurry. In these embodiments, the alcohol could be replaced with an organic solvent other than an alcohol, or a mixture of organic solvents comprising alcohol and another organic solvents, or a mixture of organic solvents other than alcohol, with the weight ratios given above pertaining to the total amount of organic solvent.

The alcohol may be a low molecular weight alcohol having up to about 4 carbon atoms, for example, methanol, ethanol, propanol or butanol. In certain embodiments, the alcohol is propanol, for example, isopropanol.

(ii) and (iii)

In certain embodiments, the wet-milling is conducted in a rotor stator mill, a colloidal mill or a media mill. These mills are similar in that they can be used to generate high shear conditions and/or high power densities.

A rotor-stator mill comprises a rotating shaft (rotor) and an axially fixed concentric stator. Toothed varieties have one or more rows of intermeshing teeth on both the rotor and the stator with a small gap between the rotor and stator, which may be varied. The differential speed between the rotor and the stator imparts extremely high shear. Particle size is reduced by both the high shear in the annular region and by particle-particle collisions and/or particle-media collisions, if media is present.

A colloidal mill is another form of rotor-stator mill. It is composed of a conical rotor rotating in a conical stator. The surface of the rotor and stator can be smooth, rough or slotted. The spacing between the rotor and stator is adjustable by varying the axial location of the rotor to the stator. Varying the gap varies not only the shear imparted to the particles but also the mill residence time and the power density applied. Particle size reduction may be affected by adjusting the gap and the rotation rate, optionally in the presence of media.

Media mills are different in operation than a rotor-stator mill but likewise can be used to generate high shear conditions and power densities. The media mill may be a pearl mill or bead mill or sand mill. The mill comprises a milling chamber and milling shaft. The milling shaft typically extends the length of the chamber. The shaft may have either radial protrusions or pins extending into the milling chamber, a series of disks located along the length of the chamber, or a relatively thin annular gap between the shaft mill chamber. The typically spherical chamber is filled with the milling media. Media is retained in the mill by a mesh screen located at the exit of the mill. The rotation of the shaft causes the protrusions to move milling media, creating conditions of high shear and power density. The high energy and shear that result from the movement of the milling media is imparted to the particles as the material is circulated through the milling chamber.

The rotation speed within the mill may be at least about 5 m/s, for example, at least about 7 m/s or at least about 10 m/s. The maximum rotation speed may vary from mill to mill, but typically is no greater than about 20 m/s, for example, no greater than about 15 m/s. Alternatively, the speed may be characterized in terms of rpm. In certain embodiments, the rpm of the rotor-stator or milling shaft in the case of a media mill may be at least about 5000 rpm, for example, at least about 7500 rpm, or at least about 10,000 rpm, or at least about 11,000 rpm. Again, maximum rpm may be vary from mill to mill, but typically is no greater than about 15,000 rpm. Power density may be at least about 2 kW/l (l=litre of slurry), for example, at least about 2.5 kW/l, or at least about 3 kW/l. In certain embodiments, the power density is no greater than about 5 kW/l, for example, no greater than about 4 kW/l.

In certain embodiments, the rpm of the rotor-stator or milling shaft in the case of a media mill may be at least about 500 rpm, for example, at least about 750 rpm, or at least about 1000 rpm, or at least about 1500 rpm. Again, maximum rpm may be vary from mill to mill, but typically is no greater than about 3000 rpm.

Residence in time within the mill is less than 24 hours, for example, equal to or less than about 18 hours, or equal to or less than about 12 hours, or equal to or less than about 6 hours, or equal to or less than about 4 hours, or equal to or less than about 220 minutes, or equal to or less than about 200 minutes, or equal to or less than about 180 minutes, or equal to or less than about 160 minutes, or equal to or less than about 140 minutes, or equal to or less than about 120 minutes, or equal to or less than about 100 minutes, or equal to or less than about 80 minutes, or equal to or less than about 60 minutes, or equal to or less than about 40 minutes, or equal to or less than about 20 minutes.

(iv) Wet-Milling in the Presence of Relatively Hard and Dense Milling Media

In certain embodiments, the milling media is characterized by having a density of at least about 3 g/cm$^3$, for example, at least about 3.5 g/cm$^3$, or at least about 4.0 g/cm$^3$, or at least about 4.5 g/cm$^3$, or at least about 5.0 g/cm$^3$, or at least about 5.5 g/cm$^3$, or at least about 6.0 g/cm$^3$. In certain embodiments, the milling media is a ceramic milling media, for example, yttria-stabilized zirconia, ceria-stabilized zirconia, fused zirconia, alumina, alumina-silica, alumina-zirconia, alumina-silica-zironia, and ytrria or ceria stabilized forms thereof. The milling media, for example, ceramic milling media, may be in the form of beads. The milling media, for example, ceramic milling media may have a size of less than about 10 mm, for example, equal to or less than about 8 mm, or equal to or less than about 6 mm, or equal to or less than about 4 mm, or equal to or less than about 2 mm, or equal to or less than about 1 mm, or equal to or less than about 0.8 mm, or equal or less than about 0.6 mm, or equal to or less than about 0.5 mm. In certain embodiments, the milling media has a size of at least 0.05 mm, mm, for example, at least about 0.1 mm, or at least about 0.2 mm, or at least about 0.3 mm, or at least about 0.4 mm.

In certain embodiments, wet milling is conducted in a planetary ball mill with milling media, for example, ceramic milling media, having a size of up to about 10 mm.

(v) Drying

Drying may be affected by any suitable technique using any suitable drying equipment. Typically, the first step of the drying (or, alternatively, the last action of the milling step) is recovering the solid material from the dispersion, for example by filtration or centrifugation, which removes the bulk of the liquid before the actual drying takes place. In some embodiments, the drying step c) is carried out by a drying technique selected from subjecting to hot air/gas in an oven or furnace, spray drying, flash or fluid bed drying, fluidized bed drying and vacuum drying.

For example, the dispersion may be directly, or optionally after filtering the dispersion through a suitable filter (e.g. a <100 µm metallic or quartz filter), introduced into an air oven at typically 120 to 230° C., and maintained under these conditions, or the drying may be carried out at 350° C., e.g., for 3 hours. In cases where a surfactant is present, the material may optionally be dried at higher temperatures to remove/destroy the surfactant, for example at 575° C. in a muffle furnace for 3 hours.

Alternatively, drying may also be accomplished by vacuum drying, where the processed dispersion is directly, or optionally after filtering the dispersion through a suitable filter (e.g. a <100 µm metallic or quartz filter), introduced, continuously or batch-wise, into a closed vacuum drying oven. In the vacuum drying oven, the solvent is evaporated by creating a high vacuum at temperatures of typically below 100° C., optionally using different agitators to move the particulate material. The dried powder is collected directly from the drying chamber after breaking the vacuum.

Drying may for example also be achieved with a spray dryer, where the processed dispersion is introduced, continuously or batch wise, into a spray dryer that rapidly pulverizes the dispersion using a small nozzle into small droplets using a hot gas stream. The dried powder is typically collected in a cyclone or a filter. Exemplary inlet gas temperatures range from 150 to 350° C., while the outlet temperature is typically in the range of 60 to 120° C.

Drying can also be accomplished by flash or fluid bed drying, where the processed expanded graphite dispersion is introduced, continuously or batch wise, into a flash dryer that rapidly disperses the wet material, using different rotors, into small particles which are subsequently dried by using a hot gas stream. The dried powder is typically collected in a cyclone or a filter. Exemplary inlet gas temperatures range from 150 to 300° C. while the outlet temperature is typically in the range of 100 to 150° C.

Alternatively, the processed dispersion may be introduced, continuously or batch-wise, into a fluidized bed reactor/dryer that rapidly atomizes the dispersion by combining the injection of hot air and the movement of small media beads. The dried powder is typically collected in a cyclone or a filter. Exemplary inlet gas temperatures range from 150 to 300° C. while the outlet temperature is typically in the range of 100 to 150° C.

Drying can also be accomplished by freeze drying, where the processed dispersion is introduced, continuously or batch wise, into a closed freeze dryer where the combination of freezing the solvent (typically water or water/alcohol mixtures) and applying a high vacuum sublimates the frozen solvent. The dried material is collected after all solvent has been removed and after the vacuum has been released.

The drying step may optionally be carried out multiple times. If carried out multiple times, different combinations of drying techniques may be employed. Multiple drying steps may for example be carried out by subjecting the material to hot air (or a flow of an inert gas such as nitrogen or argon) in an oven/furnace, by spray drying, flash or fluid bed drying, fluidized bed drying, vacuum drying or any combination thereof.

In some embodiments, the drying step is conducted at least twice, preferably wherein the drying step comprises at least two different drying techniques selected from the group consisting of subjecting to hot air in an oven/furnace, spray drying, flash or fluid bed drying, fluidized bed drying and vacuum drying.

In certain embodiments, drying is accomplished in an oven, for example, in air at a temperature of at least about 100° C., for example, at least about 105° C., or at least about 110° C. In other embodiments, drying is done by spray drying, for example, at a temperature of at least about 50° C., or at least about 60° C., or at least about 70° C.

In certain embodiments, the carbonaceous particulate starting material(s) is selected from natural graphite, synthetic graphite, coke, exfoliated graphite, graphene, few-layer graphene, graphite fibers, nano-graphite, non-graphitic carbon, carbon black, petroleum- or coal based coke, glass carbon, carbon nanotubes, fullerenes, carbon fibers, hard carbon, graphitized fined coke, or mixtures thereof. Specific carbonaceous particulate materials include, but are not limited to exfoliated graphites as described in WO 2010/089326 (highly oriented grain aggregate graphite, or HOGA graphite), or as described in co-pending EP application no. 16 188 344.2 (wet-milled and dried carbonaceous sheared nanoleaves) filed on Sep. 12, 2016.

In certain embodiments, the carbonaceous particulate starting material is graphite, for example, natural or synthetic graphite, exfoliated graphite, or an expanded graphite, or combinations thereof, for example, a combination of expanded graphite and a synthetic graphite. In certain embodiments, the synthetic graphite is surface-modified, for example, coated, for example, with an amorphous coating. In certain embodiments, the synthetic graphite is not surface-modified.

The carbonaceous particulate starting material or materials may be selected such that following co-milling they provide a carbon matrix having a BET SSA which is suitable for use negative electrode of a Li-ion battery.

In certain embodiments, the silicon particulate starting material is initially milled in the absence of carbonaceous particulate starting material, for example, for a period of up to about 1 hour, up to about 45 mins, or up to about 30 mins, or up to about 15 mins, and then combined with carbonaceous particulate starting material and co-milled for a further period.

In certain embodiments, the carbonaceous particulate starting is added gradually or in batches during the co-milling process. In certain embodiments, the silicon particulate starting materials is added gradually or in batches during the co-milling process.

In other embodiments, the carbonaceous particulate starting material is initially milled in the absence of silicon particulate starting material, and then combined with silicon particulate starting material and co-milled for a further period.

Precursor Compositions

The silicon-carbon particulate composite may be used as active material in a negative electrode with or without additional carbonaceous particulate material and or Si-active material.

Sources of additional carbonaceous particulate materials are may and various and may be selected from selected from natural graphite, synthetic graphite, coke, exfoliated graphite, graphene, few-layer graphene, graphite fibers, nano-graphite, non-graphitic carbon, carbon black, petroleum- or coal based coke, glass carbon, carbon nanotubes, fullerenes, carbon fibers, hard carbon, graphitized fined coke, or mixtures thereof. Specific carbonaceous particulate materials include, but are not limited to exfoliated graphites as described in WO 2010/089326 (highly oriented grain aggregate graphite, or HOGA graphite), or as described in co-pending EP application no. 16 188 344.2 (wet-milled and dried carbonaceous sheared nano-leaves) filed on Sep. 12, 2016.

In certain embodiments, the additional carbonaceous particulate material is carbon black, for example conductive carbon black. In certain embodiments, the carbon black has a BET SSA of less than about 100 $m^2/g$, for example, from about 30 $m^2/g$ to about 80 $m^2/g$, or from about 30 $m^2/g$ to about 60 $m^2/g$, or from about 35 $m^2/g$ to about 55 $m^2/g$, or from about 40 $m^2/g$ to about 50 $m^2/g$. In other embodiments, the carbon black, when present, may have a BET SSA of less than about 1200 $m^2/g$, for example, lower than about 1000 $m^2/g$ or lower than about 800 $m^2/g$, or lower than about 600 $m^2/g$, or lower than about 400 $m^2/g$, or lower than about 200 $m^2/g$.

In certain embodiments, the additional carbonaceous particulate material comprises at least two different types of carbonaceous particulate material, for example, at least three different types of carbonaceous particulate material. The additional carbonaceous particulate serves as a carbon matrix for the silicon-carbon particulate composite The carbon matrix may have a BET SSA of less than about 100 $m^2/g$, for example, less than about 50 $m^2/g$, or less than about 25 $m^2/g$, or less than about 20 $m^2/g$, or less than about 15 $m^2/g$, or less than about 10 $m^2/g$, or less than about 8.0 $m^2/g$, or less than about 6.0 $m^2/g$, or less than about 4.0 $m^2/g$. In certain embodiments, the carbon matrix has a BET SSA of at least about 1.0 $m^2/g$, or at least about 2.0 $m^2/g$, or at least about 3.0 $m^2/g$.

In certain embodiments, the additional carbonaceous particulate material is or comprises a synthetic graphite, for example, a surface-modified synthetic graphite. In certain embodiments, the surface-modified synthetic graphite comprises core particles with a hydrophilic non-graphitic carbon coating, having a BET SSA of less than about 49 $m^2/g$, for example, less than about 25 $m^2/g$, or less than about 10 $m^2/g$. In such embodiments, the core particles are synthetic graphite particles, or a mixture of synthetic graphite particles and silicon particles. Such a material and the preparation thereof is described in WO-A-2016008951, the entire contents of which are incorporated herein by reference. In certain embodiments, the at least one carbonaceous particulate is a surface modified carbonaceous particulate material according to any one of claims 1-10 of WO-A-2016008951 as published on 21 Jan. 2016, or that made by or obtainable by a process according to any one of claims 11-17 of WO-A-2016008951 as published on 21 Jan. 2016.

In certain embodiments, the additional carbonaceous particulate material is or comprises a surface-modified synthetic graphite, for example synthetic graphite which has been surface modified by either chemical vapor deposition ("CVD coating") or by controlled oxidation at elevated temperatures. In certain embodiments, the synthetic graphite prior to surface-modification is characterized by characterized by a BET SSA of from about 1.0 to about 4.0 $m^2/g$, and by exhibiting a ratio of the perpendicular axis crystallite size $L_c$ (measured by XRD) to the parallel axis crystallite size $L_a$ (measured by Raman spectroscopy), i.e. $L_c/L_a$ of greater than 1. Following surface-modification, the synthetic is characterized by an increase of the ratio between the crystallite size $L_c$ and the crystallite size $L_a$. In other words, the surface-modification process lowers the crystallite size $L_a$ without substantially affecting the crystallite size $L_c$. In one embodiment, the surface-modification of the synthetic graphite is achieved by contacting the untreated synthetic graphite with oxygen at elevated temperatures for a sufficient time to achieve an increase of the ratio $L_c/L_a$, preferably to a ratio of >1, or even greater, such as >1.5, 2.0, 2.5 or even 3.0. Moreover, the process parameters such as temperature, amount of oxygen-containing process gas and treatment time are chosen to keep the burn-off rate relatively low, for example, below about 10%, below 9% or below 8%. The process parameters are selected so as to produce a surface-modified synthetic graphite maintaining a BET surface area of below about 4.0 $m^2/g$.

The process for modifying the surface of synthetic graphite may involve a controlled oxidation of the graphite particles at elevated temperatures, such as ranging from about 500 to about 1100° C. The oxidation is achieved by contacting the synthetic graphite particles with an oxygen-containing process gas for a relatively short time in a suitable furnace such as a rotary furnace. The process gas containing the oxygen may be selected from pure oxygen, (synthetic or natural) air, or other oxygen-containing gases such as CO2, CO, H2O (steam), O3, and NOx. It will be understood that the process gas can also be any combination of the aforementioned oxygen-containing gases, optionally in a mixture with an inert carrier gas such as nitrogen or argon. It will generally be appreciated that the oxidation process runs faster with increased oxygen concentration, i.e., a higher partial pressure of oxygen in the process gas. The process parameters such as treatment time (i.e. residence time in the furnace), oxygen content and flow rate of the process gas as well as treatment temperature are chosen to keep the burn off rate below about 10% by weight, although it is in some embodiments desirable to keep the burn-off rate even lower, such as below 9%, 8%, 7%, 6% or 5%. The burn-off rate is a commonly used parameter, particularly in the context of surface oxidation treatments, since it gives an indication on how much of the carbonaceous material is converted to carbon dioxide thereby reducing the weight of the remaining surface-treated material.

The treatment times during which the graphite particles are in contact with the oxygen-containing process gas (e.g. synthetic air) may be relatively short, thus in the range of 2 to 30 minutes. In many instances the time period may be even shorter such as 2 to 15 minutes, 4 to 10 minutes or 5 to 8 minutes. Of course, employing different starting materials, temperatures and oxygen partial pressure may require an adaptation of the treatment time in order to arrive at a surface-modified synthetic graphite having the desired structural parameters as defined herein. Oxidation may be achieved by contacting the synthetic graphite with air or another oxygen containing gas at a flow rate generally ranging from 1 to 200 l/min, for example, from 1 to 50 l/min, or from 2 to 5 l/min. The skilled person will be able to adapt the flow rate depending on the identity of the process gas, the treatment temperature and the residence time in the furnace in order to arrive at a surface-modified graphite.

Alternatively, the synthetic graphite starting material is subjected to a CVD coating treatment with hydrocarbon-containing process gas at elevated temperatures for a sufficient time to achieve an increase of the ratio $L_c/L_a$, preferably to a ratio of >1, or even greater, such as >1.5, 2.0, 2.5 or even 3.0. Suitable process and surface-modified synthetic graphite materials are described in U.S. Pat. No. 7,115,221, the entire contents of which are hereby incorporated by reference. The CVD process coats the surface of graphite particles with mostly disordered (i.e., amorphous) carbon-containing particles. CVD coating involves contacting the synthetic graphite starting material with a process gas containing hydrocarbons or a lower alcohol for a certain 30 time period at elevated temperatures (e.g. 500° to 1000° C.). The treatment time will in most embodiments vary from 2 to 120 minutes, although in many instances the time during which the graphite particles are in contact with the process gas will only range from 5 to 90 minutes, from 10 to 60 minutes, or from 15 to 30 minutes. Suitable gas flow rates can be determined by those of skill in the art. In some embodiments, the process gas contains 2 to 10% of acetylene or propane in a nitrogen carrier gas, and a flow rate of around 1 m³/h.

In certain embodiments, the additional carbonaceous particulate is or comprises (e.g., in admixture with another carbonaceous particulate material) a synthetic graphite which has not been surface-modified, i.e., a non-surface-modified synthetic graphite. In addition to the BET SSA, particle size distribution and spring back described above, the non-surface modified synthetic particulate may have on or more of the following properties:

an interlayer spacing c/2 (as measured by XRD) of equal to or less than about 0.337 nm, for example, equal to or less than about 0.336;

a crystallite size $L_c$ (as measured by XRD) of from 100 nm to about 150 nm, for example, from about 120 nm to about 135 nm;

a xylene density of from about 2.23 to about 2.25 g/cm³, for example, from about 0.235 to about 0.245 g/cm³;

a Scott density of from about 0.15 g/cm³ to about 0.60 g/cm³, for example, from about 0.30 to about 0.45 g/cm³.

In certain embodiments, the non-surface-modified synthetic graphite is prepared according to the methods described in WO-A-2010/049428, the entire contents of which are hereby incorporated by reference.

In certain embodiments, the additional carbonaceous particulate has a BET SSA higher than about 8 m²/g and lower than about 20 m²/g, for example, lower than about 15 m²/g, or lower than about 12 m²/g, or lower than about 10 m²/g. In such embodiments, carbonaceous particulate materials, may have a spring back of less than 20%, for example, less than about 18%, or less than about 16%, or less than about 14%, or equal to or less than about 12%, or equal to or less than about 10%. In such embodiments, the carbonaceous particulate material may have a particle size distribution as follows:

a $d_{90}$ of at least about 8 µm, for example, at least about 10 µm, or at least about 12 µm, optionally less than about 25 µm, or less than about 20 µm; and/or a $d_{50}$ of from about 5 µm to about 12 µm, for example, from about 5 µm to about 10 µm, or from about 7 µm to about 9 µm; and/or a $d_{10}$ of from about 1 µm to about 5 µm, for example, from about 2 µm to about 5 µm, or from about 3 µm to about 5 µm, or from about 3 µm µm to about 4 µm.

In certain embodiments, the additional carbonaceous particulate material has a BET SSA higher than about 20 m²/g, for example, higher than about 25 m²/g, or higher than about 30 m²/g, optionally lower than about 40 m²/g, for example, lower than about 35 m²/g. In such embodiments, the second carbonaceous particulate material may have a spring back of less than 20%, for example, less than about 18%, or less than about 16%, or less than about 14%, or equal to or less than about 12%, or equal to or less than about 10%. In such embodiments, the carbonaceous particulate material may be graphite, for example, natural or synthetic graphite, for example, an exfoliated graphite (e.g. as described in WO 2010/089326 or EP application no. 16 188 344.2 (wet-milled and dried carbonaceous sheared nano-leaves) filed on Sep. 12, 2016, or expanded graphite. In such embodiments, the additional carbonaceous particulate material may have a particle size distribution as follows:

a $d_{90}$ of at least about 4 µm, for example, at least about 6 µm, or at least about 8 µm, optionally less than about 15 µm, or less than about 12 µm; and/or a $d_{50}$ of from about 2 µm to about 10 µm, for example, from about 5 µm to about 10 µm, or from about 6 µm to about 9 µm; and/or a $d_{10}$ of from about 0.5 µm to about 5 µm, for example, from about 1 µm to about 4 µm, or from about 1 µm to about 3 µm, or from about 1.5 µm µm to about 2.5 µm.

Based on the total weight of the precursor composition, the additional carbonaceous particulate material may be present in an amount of from about 1 wt. % to about 90 wt. %, for example, from about 5 wt. % to about 50 wt. %, or from about 5 wt. % to about 25 wt. %, or from about 5 wt. % to about 15 wt. %, or less than about 10 wt. %, or less than about 5 wt. %.

In certain embodiments, any of the additional carbonaceous materials described herein may be used individually in the precursor composition along with the silicon-carbon particulate composite, or as a mixture of different additional carbonaceous materials. Combinations not explicitly described are contemplated In certain embodiments, the precursor composition comprises from about 0.1 wt. % to about 90 wt. % of silicon, based on the total weight of the precursor composition, for example, from about 0.1 wt. % to about 80 wt. %, or from about 0.1 wt. % to about 70 wt. %, or from about 0.1 wt. % to about 60 wt. %, or from about 0.1 wt. % to about 50 wt. %, or from about 0.1 wt. % to about 40 wt. %, or from about 0.5 wt. % to about 30 wt. %, or from about 1 wt. % to about 25 wt. %, or from about 1 wt. % to about 20 wt. %, or from about 1 wt. % to about 15 wt. %, or from about 1 wt. to about 10 wt. %, or from about 1 wt. % to about 5 wt. %. The amount of silicon-carbon particulate composite may be varied according in order to produce a precursor composition having the required amount of silicon.

In certain embodiments, the precursor composition comprises from about 1 wt. % to about 90 wt. % of silicon, based on the total weight of the negative electrode, for example, from about 0.1 wt. % to about 80 wt. %, or from about 0.1 wt. % to about 70 wt. %, or from about 0.1 wt. % to about 60 wt. %, or from about 0.1 wt. % to about 50 wt. %, or from about 0.1 wt. % to about 40 wt. %, or from about 2 wt. % to about 30 wt. %, or from about 5 wt. % to about 25 wt. %, or from about 7.5 wt. % to about 20 wt. %, or from about 10 wt. to about 17.5 wt. %, or from about 12.5 wt. % to about 15 wt. %. Again, the amount of silicon-carbon particulate composite may be varied according in order to produce a precursor composition or negative electrode having the required amount of silicon.

The precursor composition may be made by mixing the additional carbonaceous particulates in suitable amounts forming the carbon matrix optionally together with the silicon-carbon particulate composite. In certain embodiments, the carbon matrix is prepared, and then the silicon-carbon particulate composite is combined with the carbon matrix, again, using any suitable mixing technique. In certain embodiments, the carbon matrix is prepared at a first location and then combined with the silicon-carbon particulate composite in a second location. In certain embodiments, a carbon matrix is prepared in a first location and then transported to a second location (e.g., an electrode manufacturing site) where it is combined with silicon-carbon particulate composite and optionally additional carbonaceous particulate if desired, and then with any additional components to manufacture a negative electrode therefrom, as described below.

In certain embodiments, the method of preparing a precursor composition for a negative electrode of a Li-ion battery, comprises, preparing, obtaining, providing or supplying a carbonaceous particulate and combining with a silicon-carbon particulate composite as described herein.

In certain embodiments, the method of preparing a precursor composition for a negative electron of a Li-ion battery comprises combining a silicon-carbon particulate composition with a further carbonaceous particulate.

In certain embodiments, the further carbonaceous particulate is prepared at a first location and combined with the silicon-carbon particulate composite at a second location.

In certain embodiments, the further or additional carbonaceous particulate and silicon-carbon particulate composite are prepared and combined at the same location.

Negative Electrode for a Li-Ion Battery

The silicon-carbon particulate composites and precursor compositions as defined herein can be used for manufacturing negative electrodes for Li-ion batteries, in particular Li-ion batteries empowering electric vehicles, or hybrid electric vehicles, or energy storage units.

Thus, another aspect is a negative electrode comprising a silicon-carbon particulate composite as described herein.

Another aspect is a negative electrode comprising or made from a precursor composition as described herein.

In certain embodiments, the negative electrode comprises a sufficient amount of the silicon-carbon particulate composite such that the negative electrode comprises at least 1 wt. % of silicon, based on the total weight of the electrode, for example, at least about 2 wt. %, or at least about 5 wt. %, or at least about 10 wt. %, and optionally up to about 90 wt. % of silicon, based on the total weight of the electrode, for example, up to about 80 wt. %, or up to about 70 wt. %, or up to about 60 wt. %, or up to about 50 wt. %, or up to about 40 wt. %. In certain embodiments, the negative electrode comprises from about 5 wt. % to about 35 wt. silicon, based on the total weight of the electrode, for example, from about 5 wt. % to about 30 wt. %, or from about 5 wt. % to about 25 wt. %, or from about 10 wt. % to about 20 wt. %, or from about 10 wt. % to about 18 wt. %, or from about 12 wt. % to about 16 wt. %, or from about 13 wt. % to about 15 wt. % silicon.

The negative electrode may be manufactured using conventional methods. In certain embodiments, the precursor composition is combined with a suitable binder. Suitable binder materials are many and various and include, for example, cellulose, acrylic or styrene-butadiene based binder materials such as, for example, carboxymethyl cellulose and/or PAA (polyacrylic acid) and/or styrene-butadiene rubber. The amount of binder may vary. The amount of binder may be from about 1 wt. to about 20 wt. %, based on the total weight of the negative electrode, for example, from about 1 wt. % to about 15 wt. %, or from about 5 wt. % to about 10 wt. %, or from about 1 wt. % to about 5 wt. %, or from about 2 wt. % to about 5 wt. %, or from about 3 wt. % to about 5 wt. %.

In certain embodiments, a method of manufacturing a negative electrode for a Li-ion battery, comprises forming the negative electrode from a precursor composition as described herein or obtainable by a method as described herein, optionally wherein the precursor composition comprises additional components or is combined with additional components during forming, optionally wherein the additional components include binder, as described in the preceding paragraph. The negative electrode may then be used in a Li-ion battery.

In certain aspects, therefore, there is provided a Li-ion battery comprising a negative electrode which comprises a silicon-carbon particulate composite, wherein silicon pulverization does not occur during $1^{st}$ cycle lithium intercalation and de-intercalation, and/or electrochemical capacity is maintained after 100 cycles. In certain embodiments, the Li-ion battery comprises silicon-carbon particulate composite as defined herein, optionally further comprising additional carbonaceous particulate material as described herein As described above, the Li-ion battery may be incorporated in a device requiring power. In certain embodiments, the device is an electric vehicle, for example, a hybrid electric vehicle or a plug-in electric vehicle.

In certain embodiments, the precursor composition is incorporated in an energy storage device.

In certain embodiments, the silicon particulate and/or precursor composition is incorporated in an energy storage and conversion system, for example, an energy storage and conversion system which is or comprises a capacitor, or a fuel cell.

In other embodiments, the carbon matrix is incorporated in a carbon brush or friction pad.

In other embodiments, the precursor composition is incorporated within a polymer composite material, for example, in an amount ranging from about 5-95 wt. %, or 10-85%, based on the total weight of the polymer composite material.

Uses

In related aspects and embodiments, there is provided the use of a silicon-carbon particulate composite as active material in a negative electrode of a Li-ion battery to inhibit or prevent silicon pulverization during cycling, for example, during $1^{st}$ cycle Li intercalation and de-intercalation, and/or to maintain electrochemical capacity after 100 cycles. In certain embodiments, the silicon-carbon particulate composite is a silicon particulate according to the first aspect. In certain embodiments, Li is electrochemically extracted from an amorphous lithium silicon phase and in the substantial absence of two crystalline phases containing crystalline silicon metal and crystalline $Li_{15}Si_4$ alloy.

In another embodiments, the silicon-carbon particulate composite of the first aspect is used as active material in a negative electrode of a Li-ion battery for improving cycling stability of the Li-ion battery compared to a Li-ion battery which comprises an active material which is a mixture of silicon particulate and carbonaceous particulate which is not a composite and/or is not produced by co-milling under wet conditions and/or does not have a nanostructure which inhibits or prevents silicon pulverization during cycling, for example, during $1^{st}$ cycle Li intercalation and/or does not have a nanostructure which maintains electrochemical capacity after 100 cycles.

Measurement Methods

BET Specific Surface Area (BET SSA)

The method is based on the registration of the absorption isotherm of liquid nitrogen in the range $p/p_0=0.04$-$0.26$, at 77 K. Following the procedure proposed by Brunauer, Emmet and Teller (Adsorption of Gases in Multimolecular Layers, *J. Am. Chem. Soc.*, 1938, 60, 309-319), the monolayer adsorption capacity can be determined. On the basis of the cross-sectional area of the nitrogen molecule, the monolayer capacity and the weight of the sample, the specific surface area can then be calculated. Meso- and macroporosity parameters, including average pore width and total volume of pores, were derived from the nitrogen adsorption data using the Barrett-Joyner-Halenda (BJH) theory and microporosity in relation to the total BET surface area was determined using the t-plot method. The average particle size was calculated from the BET surface area assuming nonporous spherical particles and the theoretical density of the carbon/silicon composite.

X-Ray Diffraction

XRD data were collected using a PANalytical X'Pert PRO diffractometer coupled with a PANalytical X'Celerator detector. The diffractometer has the following characteristics shown in Table 1:

TABLE 1

| Instrument data and measurement parameters | |
|---|---|
| Instrument | PANalytical X'Pert PRO |
| X-ray detector | PANalytical X'Celerator |
| X-ray source | Cu-K$_\alpha$ |
| Generator parameters | 45 kV – 40 mA |
| Scan speed | 0.07°/s (for L$_c$ and c/2) |
| | 0.01°/s (for [004]/[110] ratio) |

TABLE 1-continued

| Instrument data and measurement parameters | |
|---|---|
| Instrument | PANalytical X'Pert PRO |
| Divergence slit | 1° (for L$_c$ and c/2) |
| | 2° (for [004]/[110] ratio) |
| Sample spinning | 60 rpm |

The data were analyzed using the PANalytical X'Pert High-Score Plus software.

Interlayer Spacing c/2

The interlayer space c/2 is determined by X-ray diffractometry. The angular position of the peak maximum of the [002] reflection profiles are determined and, by applying the Bragg equation, the interlayer spacing is calculated (Klug and Alexander, X-ray Diffraction Procedures, John Wiley & Sons Inc., New York, London (1967)). To avoid problems due to the low absorption coefficient of carbon, the instrument alignment and non-planarity of the sample, an internal standard, silicon powder, is added to the sample and the graphite peak position is recalculated on the basis of the position of the silicon peak. The graphite/silicon sample is mixed with the silicon standard powder by adding a mixture of polyglycol and ethanol. The obtained slurry is subsequently applied on a glass plate by means of a blade with 150 µm spacing and dried.

Crystallite Size L$_c$

Crystallite size L$_c$ is determined by analysis of the [002] X-ray diffraction profiles and determining the widths of the peak profiles at the half maximum. The broadening of the peak should be affected by crystallite size as proposed by Scherrer (P. Scherrer, *Göttinger Nachrichten* 1918, 2, 98). However, the broadening is also affected by other factors such X-ray absorption, Lorentz polarization and the atomic scattering factor. Several methods have been proposed to take into account these effects by using an internal silicon standard and applying a correction function to the Scherrer equation. For the present disclosure, the method suggested by Iwashita (N. Iwashita, C. Rae Park, H. Fujimoto, M. Shiraishi and M. Inagaki, *Carbon* 2004, 42, 701-714) was used. The sample preparation was the same as for the c/2 determination described above.

Crystallite Size L$_a$

Crystallite size L$_a$ is calculated from Raman measurements using equation:

$$L_a[\text{Angstrom (Å)}] = C \times (I_G/I_D)$$

where constant C has values 44[Å] and 58[Å] for lasers with wavelength of 514.5 nm and 632.8 nm, respectively.

Xylene Density

The analysis is based on the principle of liquid exclusion as defined in DIN 51 901. Approx. 2.5 g (accuracy 0.1 mg) of powder is weighed in a 25 ml pycnometer. Xylene is added under vacuum (20 mbar). After a few hours dwell time under normal pressure, the pycnometer is conditioned and weighed. The density represents the ratio of mass and volume. The mass is given by the weight of the sample and the volume is calculated from the difference in weight of the xylene filled pycnometer with and without sample powder. Reference: DIN 51 901

Scott Density (Apparent Density)

The Scott density is determined by passing the dry powder through the Scott volumeter according to ASTM B 329-98 (2003). The powder is collected in a 1 in 3 vessel (corresponding to 16.39 cm³) and weighed to 0.1 mg accuracy. The ratio of weight and volume corresponds to the Scott density. It is necessary to measure three times and calculate the average value. The bulk density is calculated from the weight of a 250 mL sample in a calibrated glass cylinder.
Reference: ASTM B 329-98 (2003)

Spring-Back

Spring-back is a source of information regarding the resilience of compacted graphite/silicon powders. A defined amount of powder is poured into a die. After inserting the punch and sealing the die, air is evacuated from the die. A compression force of 0.5 tons/cm$^2$ is applied and the powder height is recorded. This height is recorded again after the pressure has been released. Spring-back is the height difference in percent relative to the height under pressure.

Particle Size Distribution by Laser Diffraction (Wet PSD)

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. A small sample of silicon/carbon dispersion or dried silicon/carbon is mixed with a few drops of wetting agent and a small amount of water. The sample is prepared in the described manner and measured after being introduced in the storage vessel of the apparatus filled with water that uses ultrasonic waves for improving dispersion.
References: -ISO 13320-1/-ISO 14887

Particle Size Distribution by Laser Diffraction (Dry PSD)

The Particle Size Distribution is measured using a Sympatec HELOS BR Laser diffraction instrument equipped with RODOS/L dry dispersion unit and VIBRI/L dosing system. A small sample is placed on the dosing system and transported using 3 bars of compressed air through the light beam. The particle size distribution is calculated and reported in μm for the three quantiles: 10%, 50% and 90%.
References: ISO 13320-1

Lithium-Ion Negative Electrode Half Cell Test

This test was used to quantify the specific charge of nano-Si/carbon-based electrodes. General half-cell parameters: 2 electrode coin cell design with Li metal foil as counter/reference electrode, cell assembly in an argon filled glove box (oxygen and water content <1 ppm). Diameter of electrodes: 13 mm. A calibrated spring (100 N) was used in order to have a defined force on the electrode. Tests were carried out at 25° C.

Electrode loading on copper electrode: 6 mg/cm$^2$. Electrode density: 1.3 g/cm$^3$.

Drying procedure: Coated Cu foils were dried for 1 h at 80° C., followed by 12 h at 150° C. under vacuum (<50 mbar). After cutting, the electrodes were dried for 10 h at 120° C. under vacuum (<50 mbar) before insertion into the glove box.

Electrolyte: Ethylenecarbonate (EC): Ethylmethylcarbonate (EMC) 1:3 (v/v), 1 M LiPF$_6$, 2% fluoroethylene carbonate, 0.5% vinylene carbonate. Separator: Glass fiber sheet, ca. 1 mm.

Cycling program using a potentiostat/galvanostat: 1$^{st}$ charge: constant current step 20 mA/g to a potential of 5 mV vs. Li/Li$^+$, followed by a constant voltage step at 5 mV vs. Li/Li$^+$ until a cutoff current of 5 mA/g was reached. 1$^{st}$ discharge: constant current step 20 mA/g to a potential of 1.5 V vs. Li/Li$^+$, followed by constant voltage step at 1.5 V vs. Li/Li$^+$ until a cutoff current of 5 mA/g was reached. Further charge cycles: constant current step at 50 mA/g to a potential of 5 mV vs. Li/Li$^+$, followed by a constant voltage step at 5 mV vs. Li/Li$^+$ until a cutoff current of 5 mA/g was reached. Further discharge cycles: constant current step at 372 mA/g to a potential of 1.5 V vs. Li/Li$^+$, followed by constant voltage step at 1.5 V vs. Li/Li$^+$ until a cutoff current of 5 mA/g was reached.

Numbered Embodiments

The present disclosure may be further illustrated by, but is not limited to, the following numbered embodiments:

1. A silicon-carbon particulate composite suitable for use as active material in a negative electrode of a Li-ion battery, having one or more of:
   (i) microporosity of at least 5.0%, optionally no greater than about 25.0%;
   (ii) a BJH average pore width of less than about 250 Å; and
   (iii) a BJH volume of pores of from about 0.05 cm$^3$/g to about 0.25 cm$^3$/g.

2. The silicon-carbon particulate composite according to embodiment 1, having a BET SSA of equal to or lower than about 400 m$^2$/g and/or an average particle size of from about 50-2000 Å.

3. The silicon-carbon particulate composite according to embodiment 1 or 2, having one or more of:
   (i) a microporosity of from about 5% to about 20%, for example, from about 8-17%;
   (ii) a BJH average pore width of from about 75 Å to about 150 Å, for example, from about 100-150 Å; and
   (iii) a BJH volume of pores of at least about 0.50 cm$^3$/g, for example, from about 0.50 cm$^3$/g to about 1.25 cm$^3$/g.

4. The silicon-carbon particulate composite according to embodiment 3, having:
   (1) a BET specific surface area (SSA) of from about 100 to about 400 m$^2$/g, for example, from about 200-400 m$^2$/g, or from about 250-350 m$^2$/g, or from about 275-325 m$^2$/g, or from about 275-300 m$^2$/g, or from about 300-325 m$^2$/g; and/or
   (2) an average particle size of from about 50 Å to about 300 Å, for example, from about 50-200 Å, or from about 50-150 Å, or from about 50-100 Å, or from about 75-100 Å, or from about 80-95 Å.

5. The silicon-carbon particulate composition according to embodiment 1 or 2, having one or more of:
   (i) a microporosity of from about 5% to about 15%, for example, from about 10-15%;
   (ii) a BJH average pore width of from about 100 Å to about 180 Å, for example, from about 130 Å to about 150 Å, and
   (iii) a BJH volume of pores of at least about 0.10 cm$^3$/g, for example, from about 0.10 cm$^3$/g to about 0.25 cm$^3$/g.

6. The silicon-carbon particulate composite according to embodiment 5, having:
   (1) a BET specific surface area (SSA) of from about 10 m$^2$/g to about 100 m$^2$/g, for example, from about 20-80 m$^2$/g, or from about 20-60 m$^2$/g, or from about 30-50 m$^2$/g, or from about 35-45 m$^2$/g, or from about 40-45 m$^2$/g; and/or
   (2) an average particle size of from about 250 Å to about 1000 Å, for example, from about 450-850 Å, or from about 500-800 Å, or from about 550-700 Å, or from about 575-675 Å, or from about 600-650 Å, or from about 620-640 Å.
7. The silicon-carbon particulate composite according to any one of embodiments 1-6, wherein the carbon comprises or is natural and/or synthetic graphite, or a mixture of natural and synthetic graphite, optionally wherein the natural or synthetic graphite is exfoliated graphite or expanded graphite.
8. A silicon-carbon particulate composite having a nanostructure which inhibits or prevents silicon pulverization and/or maintains electrochemical capacity when used as active material in a negative electrode of a Li-ion battery.
9. A silicon-carbon particulate composite according to any one of embodiments 1-8, wherein the silicon-carbon particulate composite is a co-milled composite.
10. A precursor composition for a negative electrode of a Li-ion battery, the precursor composition comprising a silicon-carbon particulate composite according to any one of embodiments 1-9, comprising a further carbonaceous particulate, optionally wherein the further carbonaceous particulate comprises at least two different types of carbonaceous particulate.
11. The precursor composition according to embodiment 10, wherein the amounts of silicon-carbon particulate composite and further carbonaceous particulate are such that the precursor composition comprises from about 1 wt. % to about 90 wt. % silicon, based on the total weight of the precursor composition, for example, from about 1 wt. % to about 50 wt. %, or from about 1 wt. % to about 25 wt. %.
12. The precursor composition according to embodiment 10 or 11, wherein the BET SSA of the precursor composition is lower than the BET SSA of the silicon-carbon particulate composite, for example, equal to or lower than about 10 $m^2/g$.
13. Negative electrode comprising a silicon-carbon particulate composite according to any one of embodiments 1-9.
14. Negative electrode comprising a precursor composition according to any one of embodiments 10-12.
15. A Li-ion battery comprising an electrode according to embodiment 13 or 14.
16. A Li-ion battery comprising a negative electrode which comprises a silicon-carbon particulate composite, wherein silicon pulverization does not occur during $1^{st}$ cycle lithium intercalation and de-intercalation and/or wherein electrochemical capacity is maintained after 100 cycles.
17. A method of making a silicon-carbon particulate composite, comprising co-milling silicon and carbonaceous starting materials under wet conditions to produce a silicon-carbon particulate composite having a nanostructure which inhibits or prevents silicon pulverization when used as active material in a negative electrode of a Li-ion battery and/or which maintains electrochemical capacity of a negative electrode.
18. The method according to embodiment 17, wherein the silicon starting material is a micronized silicon particulate having a particle size of from about 1 µm to about 100 µm, for example, from about 1 µm to about 10 µm.
19. The method according to embodiment 17 or 18, wherein the method comprises one or more of the following:
   wet-milling in the presence of a solvent, for example, an aqueous alcohol-containing mixture,
   wet-milling in a rotor-stator mill, a colloidal mill or a media mill,
   wet-milling under conditions of high shear and/or high power density,
   wet-milling in the presence of relatively hard and dense milling media, and drying.
20. The method according to any one of embodiments 17-19, wherein co-milling is conducted in the presence of a milling media having a density of at least 3.0 $g/cm^3$, for example, at least about 5.0 $g/cm^3$.
21. The method according to embodiment 19 or 20, wherein the milling media has a particle size of less than about 10 mm, for example, less than about 1 mmm.
22. The method according to embodiment 20 or 21, wherein the milling media is yttria-stabilized zirconia.
23. The method according to any one of embodiments 17-22, wherein co-milling is conducted in a bead mill.
24. The method according to any one of embodiments 17-23, wherein the power density during co-milling is at least about 2.5 kW/l.
25. A method of preparing a precursor composition for a negative electrode of a Li-ion battery, comprising preparing, obtaining, providing or supplying a silicon-carbon particulate composite according to any one of embodiments 1-9 or obtainable by a method according to any one of embodiments 17-24, and combining with a further carbonaceous particulate.
26. A method of preparing a precursor composition for a negative electrode of a Li-ion battery, comprising preparing, obtaining, providing or supplying a carbonaceous particulate and combining with a silicon-carbon particulate composite according to any one of embodiments 1-9 or obtainable by a method according to any one of embodiments 17-24.
27. A method of preparing a precursor composition for a negative electrode of a Li-ion battery, comprising combining a silicon-carbon particulate composite according to any one of embodiments 1-9 or obtainable by a method according to any one of embodiments 17-24 with a further carbonaceous particulate.
28. The method according to any one of embodiments 25-27, wherein the further carbonaceous particulate is prepared at a first location and combined with the silicon-carbon particulate composite at a second location.
29. A method according to any one of embodiments 25-27, wherein the further carbonaceous particulate and silicon-carbon particulate composite are prepared and combined at the same location.
30. A method of manufacturing a negative electrode for a Li-ion battery, comprising forming the negative electrode from a precursor composition according to any one of embodiments 10-12 or obtainable by a method according to any one of embodiments 25-29, optionally wherein the precursor composition comprises additional components or is combined with additional components during forming, optionally wherein the additional components include binder.
31. Use of a silicon-carbon particulate composite as active material in a negative electrode of a Li-ion battery to inhibit or prevent silicon pulverization during cycling, for example, during $1^{st}$ cycle Li intercalation or de-intercalation and/or to maintain electrochemical capacity after 100 cycles.

32. Use according to embodiment 31, wherein the silicon-carbon particulate composite is a silicon-carbon particulate composite according to any one of embodiments 1-9.
33. Use according to embodiment 31 or 32, wherein Li is electrochemically extracted from an amorphous lithium silicon phase and in the substantial absence of two crystalline phases containing crystalline Si silicon metal and crystalline $Li_{15}S_4$ alloy.
34. Use, as active material in a negative electrode of a Li-ion battery, of a silicon-carbon particulate composite according to any one of embodiments 1-9, for improving cycling stability of the Li-ion battery compared to a Li-ion battery which comprises an active material which is a mixture of silicon particulate and carbonaceous particulate which is not a composite and/or does not have a nanostructure which inhibits or prevents silicon pulverization during cycling, for example, during $1^{st}$ cycle Li intercalation, and/or which is not prepared by co-milling and/or does not have a nanostructure which maintains electrochemical after 100 cycles.
35. Use of a carbonaceous particulate material in a negative electrode of a Li-ion battery, wherein the electrode comprises a silicon-carbon particulate composite according to any one of embodiments 1-9.
36. A device comprising the electrode according to embodiment 13 or 14, or comprising the Li-ion battery according to embodiment 15 or 16.
37. The device according to embodiment 36, wherein the device is an electric vehicle or a hybrid electric vehicle, or a plug-in hybrid electric vehicle.
38. An energy storage cell comprising a silicon-carbon particulate composite according to any one of embodiments 1-9 or a precursor composition according to any one of embodiments 10-12.
39. An energy storage and conversion system comprising a silicon-carbon particulate composite according to any one of embodiments 1-9 or a precursor composition according to any one of embodiments 10-12.
40. The energy storage and conversion system according to embodiment 39, wherein the system is or comprises a capacitor, or a fuel cell.

Having described the various aspects of the present disclosure in general terms, it will be apparent to those of skill in the art that many modifications and slight variations are possible without departing from the spirit and scope of the present disclosure. The present disclosure is furthermore described by reference to the following, non-limiting working examples.

EXAMPLES

Example 1

Si—C Particulate Composite Formation

Prep A 300 g of micronized silicon particles (1-10 µm), 30 g of an expanded graphite and 3 g of polyacrylic acid (PAA) were dispersed with 2400 g of water and 600 g of isopropanol and milled in a bead mill machine using 0.35-0.5 mm yttrium-stabilized zirconia at 3.5 kW/l. The slurry was collected after 75 min and dried in a spray drier at 70° C. (producing Nano-composite 1) or dried in an air oven at 110° C. (producing Nano-composite 2).

Prep B 30 g of micronized silicon particles (1-10 µm), 65 g of an expanded graphite were dispersed with 2400 g of water and 600 g of isopropanol and milled in a bead mill machine using 0.35-0.5 mm yttrium-stabilized zirconia at 3.5 kW/l for 40 min, and afterwards 200 g of synthetic graphite having a BET SSA of about 12 $m^2$/g were added and further milled for 15 min. The slurry was collected (producing Nano-composite 4) or dried in an air oven at 110° C. (producing Nano-composite 3).

Figure 1B:
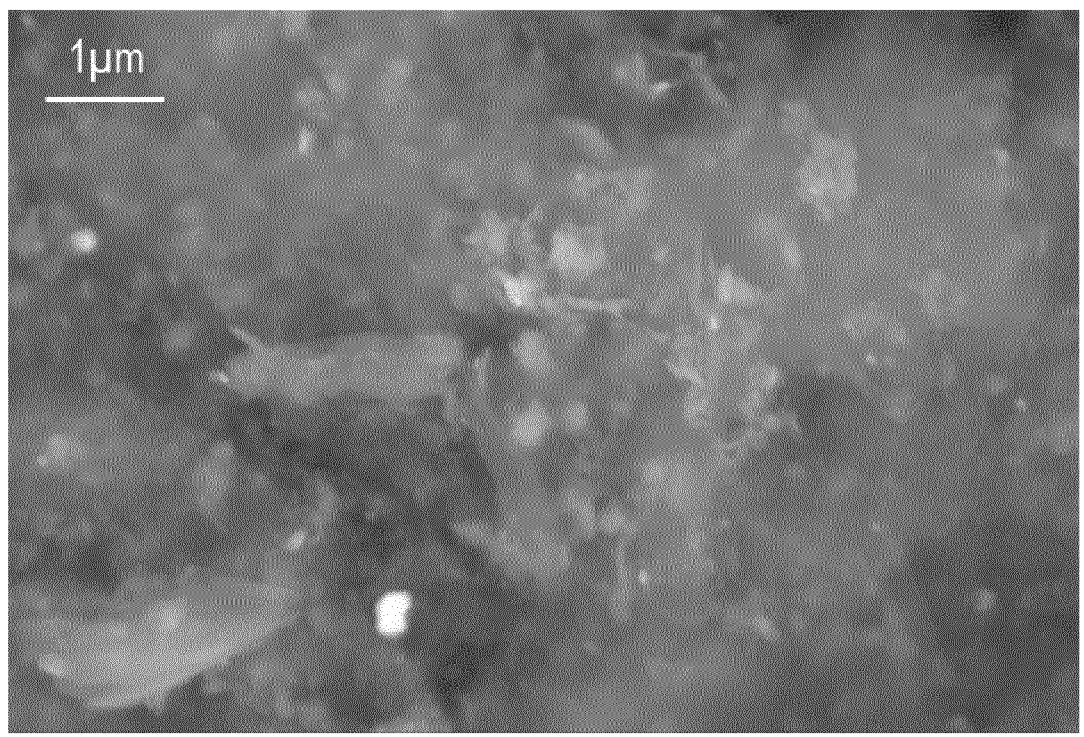
FIG. 1B is a SEM picture of Nano-composite 3 prepared according to the Examples.
Figure 2:
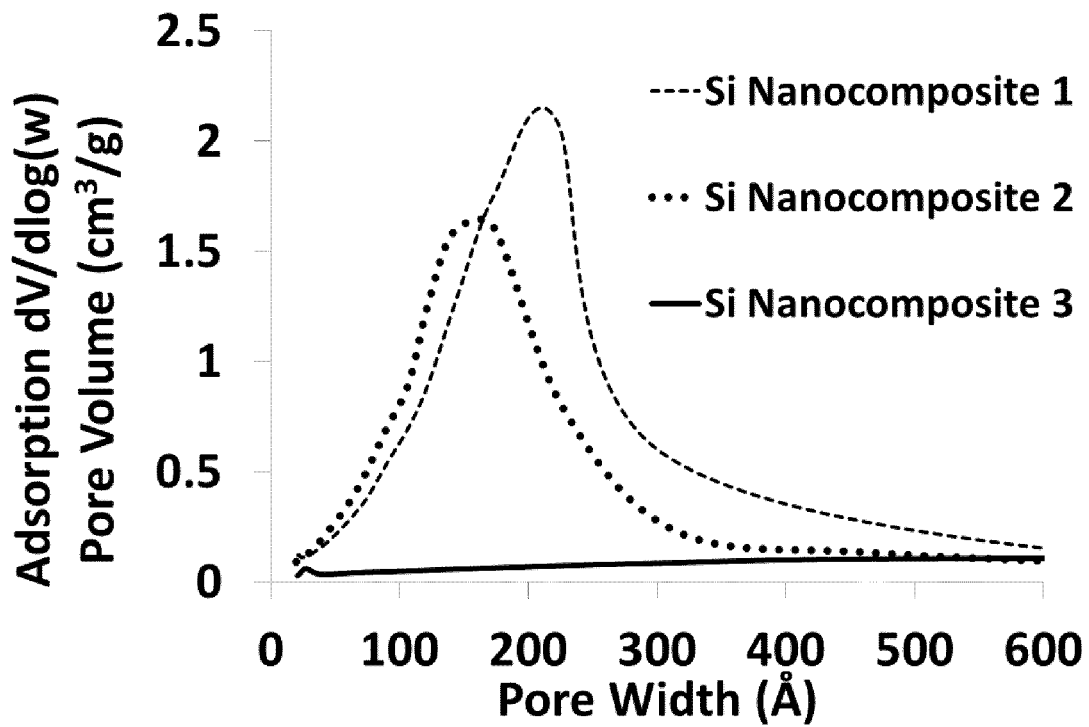
FIG. 2 is a graph depicting pore size distributions of Nano-composites 1, 2 and 3 prepared according to the Examples.

SEM pictures of Nano-composite 1 and Nano-composite 3 are shown in FIGS. 1A and 1B, respectively. The pore size distributions of Nano-composites 1, 2 and 3 are shown in FIG. 2, with this and additional data summarized in Table 1.

TABLE 1

|  | Nano-composite 1 | Nano-composite 2 | Nano-composite 3 |
| --- | --- | --- | --- |
| BET ($m^2$/g) | 316.0 | 286.5 | 41.4 |
| Microporosity (%) | 15.7 | 9.6 | 12.1 |
| BJH volume of pores ($cm^3$/g) | 1.02 | 0.84 | 0.145 |
| BJH average pore width (Å) | 133.5 | 109.9 | 140.2 |
| Average Particle Size (Å) | 82.5 | 91.1 | 629.8 |

Example 2

Dispersion formulation A: 2% Super C45 conductive carbon black, 7% CMC (Na-carboxymethyl cellulose) binder, 91% Nano-composite 3

Dispersion preparation: Combined were 0.25 g Super C45, 11.4 g, Nano-composite 3, 70 g water/ethanol mixture (7:3 w/w), then 5 min with a rotor-stator mixer at 16'000 rpm. 0.88 g of the CMC binder was slowly added while stirring with a mechanical mixer at 1'000 rpm. A rotor-stator mixer at 16'000 rpm was used for 2 min, and stirred for 30 min under vacuum at 1'000 rpm.

Dispersion formulation B: 2% Super C45 conductive carbon black, 7% CMC (Na-carboxymethyl cellulose) binder, 91% Nano-composite 4.

Dispersion preparation: Combined were 0.25 g Super C45, 91.2 g Nano-composite 4, and stirred with a glass rod. 0.88 g of the CMC binder was slowly added while stirring with the mechanical mixer 1'000 rpm. A rotor-stator mixer at 16'000 rpm for 2 min was used stirred for 30 min under vacuum at 1'000 rpm.

Dispersion formulation C (comparative): 2.38 g (5%) Si particulate (100 nm diameter, US Research Nanomaterials Inc.), 45.12 g (90%) graphite active material, 0.50 g (1%) Super C45 conductive carbon black, 50.0 g (1.5%) CMC (Na-carboxymethylcellulose) binder solution (1.5% solid content in water), 2.6 g (2.5%) SBR (styrene-butadiene rubber) binder solution (50% solid content in water). Dispersion preparation: To CMC binder solution, were added Super C45 conductive carbon black, the Si-particulate, stirred with a glass rod, then stirred with rotor-stator mixer at 11'000 rpm for 5 min. The graphite active material and the SBR binder were added and stirred with a mechanical mixer at 1'000 rpm for 30 min under vacuum.

Electrode loading on copper electrode: 3 mg/$cm^2$. Electrode density: 1.4 g/$cm^3$.

Drying procedure: Coated Cu foils were dried for 1 h at 80° C., followed by 12 h at 150° C. under vacuum (<50 mbar). After cutting, the electrodes were dried for 10 h at 120° C. under vacuum (<50 mbar) before insertion into the glove box. Electrolyte: Ethylenecarbonate (EC): Ethylmethylcarbonate (EMC) 1:3 (v/v), 1 M LiPF$_6$, 2% fluoroethylene carbonate, 0.5% vinylene carbonate. Separator: Glass fiber sheet, ca. 1 mm.

Electrochemical capacity and cycling stability for each formulation were tested in accordance with the methods described herein.

Figure 3:
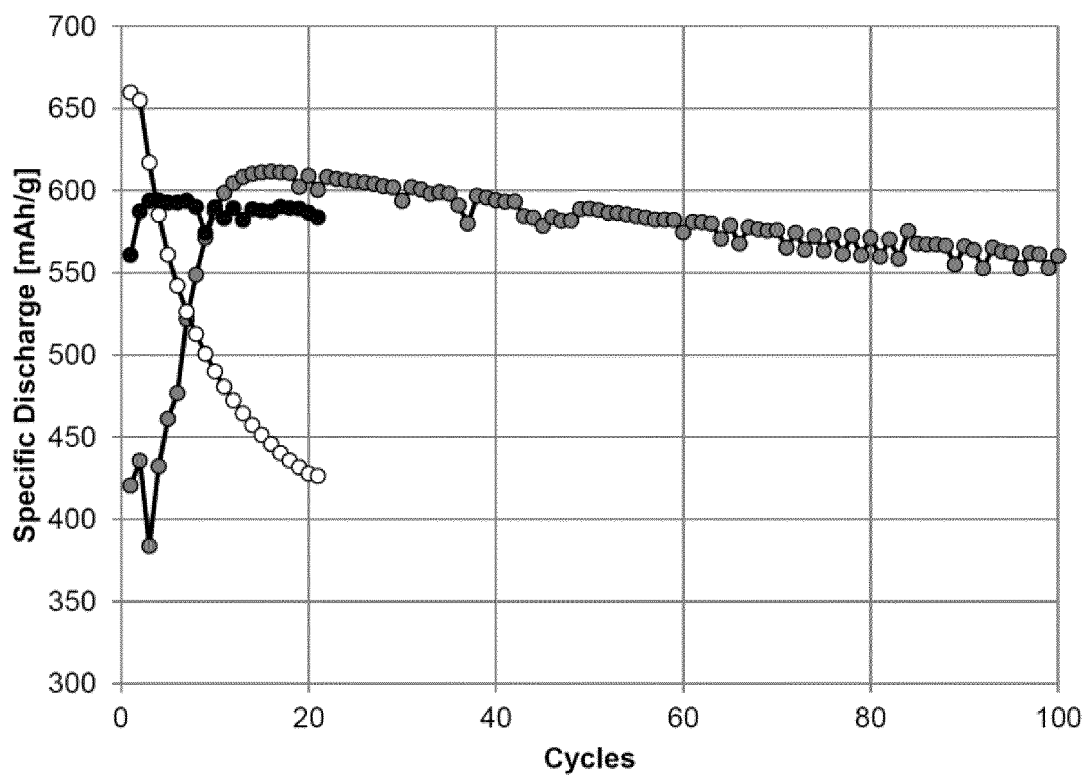
FIG. 3 is a graph showing the cycling performance of a negative electrode made from Dispersion formulation A (black filled circles), Dispersion formulation B (grey filled circles) and Dispersion formulation C (open circles).
Figure 4A:
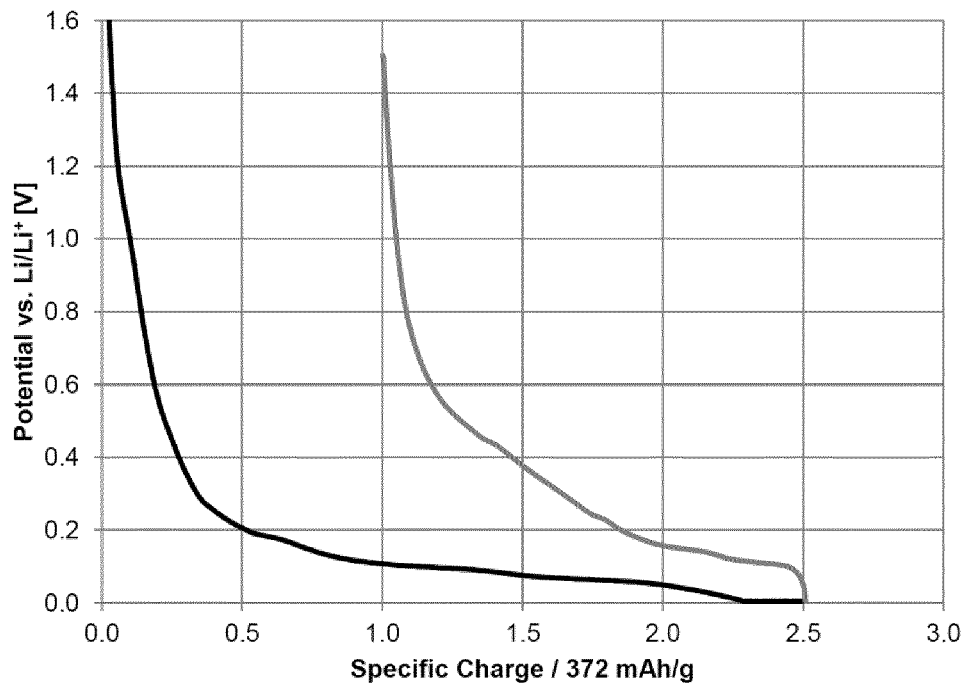
FIG. 4 shows the $1^{st}$ cycle lithium intercalation (black curves) and de-intercalation (gray curves) of a negative electrode made from Dispersion formulation A (FIG. 4A), Dispersion formulation B (FIG. 4B) and Dispersion formulation C including the commercial Si-particulate (FIG. 4C).
Figure 4B:
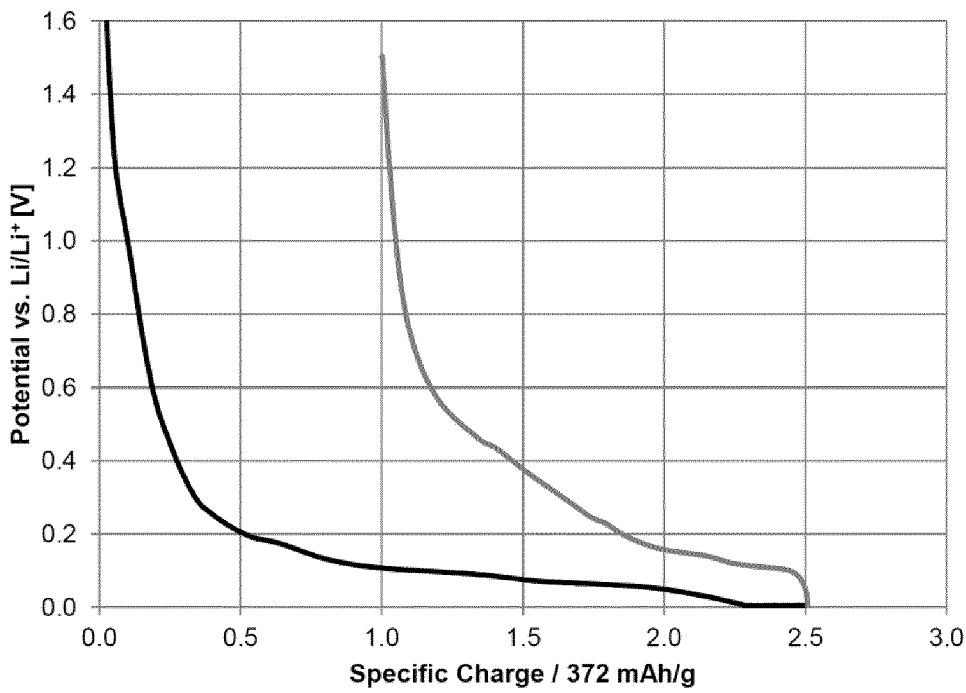
Figure 4C:
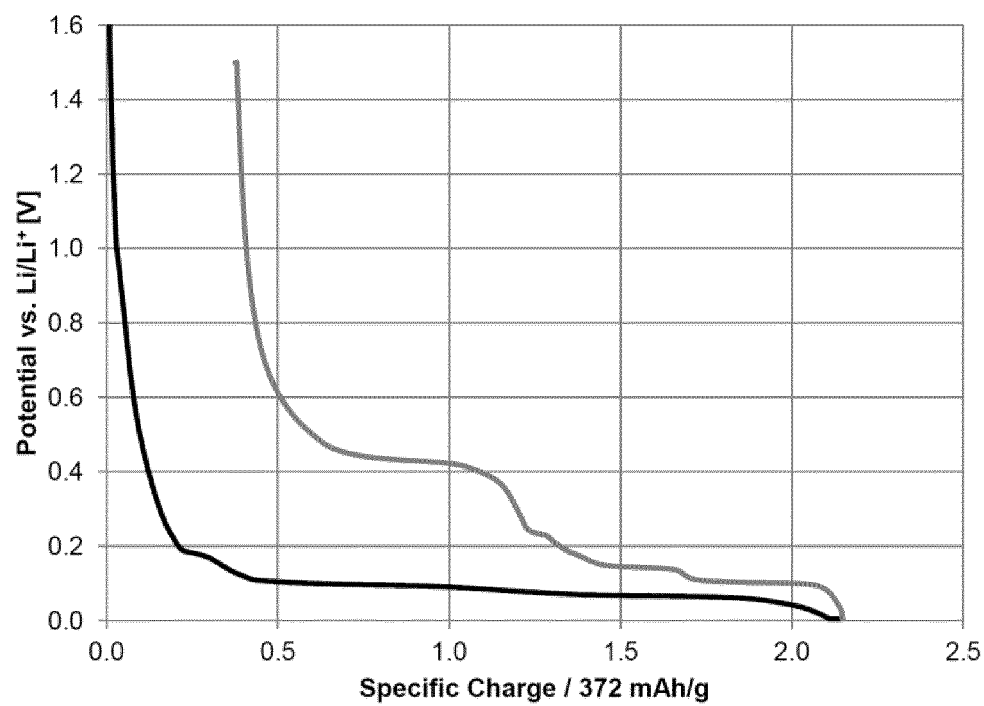

Cycling performance of the negative electrodes made from Dispersion formulation A (black filled circles), Dispersion formulation B (grey filled circles) and Dispersion formulation C (open circles) is shown in FIG. 3. 1$^{st}$ cycle lithium intercalation (black curves) and de-intercalation (gray curves) of the negative electrodes are shown in FIG. 4A (Dispersion formulation A), FIG. 4B (Dispersion formulation B) and FIG. 4C (Dispersion formulation C including the commercial Si-particulate).

The de-intercalation curves (FIGS. 4A and 4B) demonstrates the absence of a plateau at 0.45 V vs. Li/Li$^+$ for Nanocomposite 3 and 4, whereas the commercially available Si-particulate exhibits such a plateau, indicating significant silicon pulverization.

The invention claimed is:

1. A method of making a silicon-carbon particulate composite, comprising co-milling silicon and carbonaceous starting materials under wet conditions to produce a silicon-carbon particulate composite having a nanostructure which inhibits or prevents silicon pulverization when used as active material in a negative electrode of a Li-ion battery and/or which maintains electrochemical capacity of a negative electrode;
   wherein the carbonaceous starting material is selected from a natural graphite, a synthetic graphite, or a mixture of natural and synthetic graphite; wherein the natural or synthetic graphite is exfoliated graphite or expanded graphite.

2. The method according to claim 1, wherein the silicon starting material is a micronized silicon particulate having a particle size of from about 1 μm to about 100 μm.

3. The method according to claim 1, wherein the method comprises one or more of the following:
   wet-milling in the presence of a solvent selected from an aqueous solvent, an organic solvent, or mixtures thereof,
   wet-milling in a rotor-stator mill, a colloidal mill or a media mill,
   wet-milling under conditions of high shear and/or high power density,
   wet-milling in the presence of relatively hard and dense milling media, and drying.

4. The method according to claim 3, wherein the solvent is an aqueous alcohol-containing mixture.

5. The method according to claim 3, wherein the solvent is an organic solvent.

6. The method according to claim 3, wherein co-milling is conducted in the presence of a milling media having a density of at least 3.0 g/cm$^3$.

7. The method according to claim 6, wherein the milling media has a particle size of less than about 10 mm.

8. The method according to claim 6, wherein the milling media is yttria-stabilized zirconia.

9. The method according to claim 3, wherein co-milling is conducted in a bead mill.

10. The method according to claim 1, wherein the power density during co-milling is at least about 2.5 kW/l.

11. The method according to claim 1, wherein the silicon-carbon particulate composite is characterized by having one or more of:
   (i) a BET SSA of equal to or lower than about 400 m$^2$ g;
   (ii) an average particle size of from about 50-2000 Å;
   (iii) a microporosity of at least about 5%;
   (iv) a BJH average pore width of less than about 250 Å; and
   (v) a BJH volume of pores of at least about 0.50 cm$^3$/g.

12. The method according to claim 1, wherein the silicon-carbon particulate composite is further characterized by having one or more of:
   (i) a microporosity of from about 5% to about 15%;
   (ii) a BJH average pore width of from about 100 Å to about 180 Å;
   (iii) a BJH volume of pores of at least about 0.10 cm$^3$/g;
   (iv) a BET specific surface area (SSA) of from about 10 m$^2$/g to about 100 m$^2$/g; and
   (v) an average particle size of from about 250 Å to about 1000 Å.

13. The method of claim 1, wherein the carbonaceous particulate starting material is initially milled in the absence of silicon particulate starting material, and then combined with silicon particulate starting material and co-milled for a further period.

14. The method of claim 1, wherein the silicon particulate starting material is initially milled in the absence of carbonaceous particulate starting material, and then combined with carbonaceous particulate starting material and co-milled for a further period.

15. The method of claim 1, wherein the carbonaceous particulate starting material is added gradually or in batches during the co-milling process.

16. The method of claim 1, wherein the silicon particulate starting material is added gradually or in batches during the co-milling process.

* * * * *